US011363805B1

(12) United States Patent
Hancock (10) Patent No.: US 11,363,805 B1
(45) Date of Patent: Jun. 21, 2022

(54) LURE WITH REMOVABLE TAIL

(71) Applicant: RMB Importing, LLC, Fort Atkinson, WI (US)

(72) Inventor: Robin Hancock, Elkhorn, WI (US)

(73) Assignee: RMB Importing, LLC, Fort Atkinson, WI (US)

( * ) Notice: Subject to any disclaimer, the term of this patent is extended or adjusted under 35 U.S.C. 154(b) by 0 days.

(21) Appl. No.: 17/108,032

(22) Filed: Dec. 1, 2020

(51) Int. Cl.
*A01K 85/18* (2006.01)
*A01K 85/01* (2006.01)

(52) U.S. Cl.
CPC ............. *A01K 85/18* (2013.01); *A01K 85/01* (2013.01)

(58) Field of Classification Search
CPC ......... A01K 84/18; A01K 85/16; A01K 85/01
See application file for complete search history.

(56) References Cited

U.S. PATENT DOCUMENTS

| 1,155,883 | A | * | 10/1915 | Burkman | A01K 85/16 43/42.16 |
| 1,867,458 | A | * | 7/1932 | Keuper | A01K 85/18 43/42.09 |
| 2,183,816 | A | * | 12/1939 | Lovelace | A01K 85/16 43/42.08 |
| 2,295,292 | A | * | 9/1942 | Rogers | A01K 85/16 43/42.09 |
| 2,517,298 | A | * | 8/1950 | Gaylord | A01K 85/16 43/42.47 |
| 2,546,772 | A | * | 3/1951 | Neff | A01K 85/16 43/42.09 |
| 2,556,533 | A | * | 6/1951 | Graaten | A01K 85/18 43/42.15 |
| 2,875,549 | A | * | 3/1959 | O'Sullivan | A01K 85/16 43/42.22 |
| 2,994,982 | A | * | 8/1961 | Murawski | A01K 85/16 43/35 |
| 3,108,390 | A | * | 10/1963 | Knight | A01K 85/16 43/42.09 |
| 3,210,883 | A | * | 10/1965 | Ulsh | A01K 91/04 43/43.12 |
| 3,218,750 | A | * | 11/1965 | Lewin | A01K 85/16 43/42.28 |
| 3,497,987 | A | * | 3/1970 | Perrin | A01K 85/00 43/42.28 |
| 3,750,321 | A | | 8/1973 | McClellan | |
| 3,855,722 | A | | 12/1974 | Moore | |

(Continued)

FOREIGN PATENT DOCUMENTS

FI 61388 B 4/1982

OTHER PUBLICATIONS http://web.archive.org/web/20120109072551/http://www.basspro.com/Bass-Pro-Shops-Tourney-Rattle-Bait/product/10225063/; website screenshot for the Bass Pro Shops Tourney Rattle Bait; Jan. 9, 2012.

(Continued)

*Primary Examiner* — Magdalena Topolski
*Assistant Examiner* — Shada Mohamed Alghailani
(74) *Attorney, Agent, or Firm* — Shane Delsman; Godfrey & Kahn, S.C.

(57) ABSTRACT

A lure having a body with a line tie and one or more hooks attached to the body. The body may be formed by a head portion and a tail portion that is removably attached to and from the head portion. The lure may also include one or more noisemaking elements.

20 Claims, 11 Drawing Sheets

(56) References Cited

U.S. PATENT DOCUMENTS

| | | | | |
|---|---|---|---|---|
| 3,863,378 | A * | 2/1975 | Walker | A01K 85/00 43/42.28 |
| 3,881,272 | A | 5/1975 | Parker | |
| 3,909,974 | A | 10/1975 | Kent | |
| 3,979,853 | A * | 9/1976 | Storm | A01K 85/16 43/42.29 |
| 4,045,903 | A | 9/1977 | Parker | |
| 4,123,870 | A * | 11/1978 | Wiskirchen | A01K 83/00 43/42.37 |
| 4,167,076 | A * | 9/1979 | Weaver | A01K 85/00 43/42.2 |
| 4,672,768 | A * | 6/1987 | Pippert | A01K 85/00 43/42.09 |
| 4,674,224 | A * | 6/1987 | Williams | A01K 85/16 43/42.06 |
| 4,712,326 | A | 12/1987 | Hoover et al. | |
| 4,785,569 | A | 11/1988 | Thomas, Jr. | |
| 4,791,749 | A * | 12/1988 | Stazo | A01K 85/00 43/42.24 |
| 4,791,750 | A | 12/1988 | Gammill | |
| 4,807,383 | A | 2/1989 | Delwiche | |
| 4,807,387 | A * | 2/1989 | Dougherty, Jr. | A01K 85/16 43/42.06 |
| 4,839,983 | A * | 6/1989 | Pippert | A01K 85/01 43/17.6 |
| 5,070,639 | A * | 12/1991 | Pippert | A01K 85/00 43/42.31 |
| 5,331,762 | A * | 7/1994 | Banks | A01K 85/16 43/42.09 |
| 5,369,906 | A * | 12/1994 | Anterni | A01K 85/16 43/42.09 |
| 5,381,620 | A * | 1/1995 | Gibbs | A01K 85/00 43/42.09 |
| 5,491,927 | A * | 2/1996 | Ortiz | A01K 85/00 43/42.28 |
| 5,564,219 | A * | 10/1996 | Petri | A01K 85/00 43/42.28 |
| 5,588,246 | A | 12/1996 | Hill | |
| 5,806,234 | A | 9/1998 | Nichols | |
| 5,815,978 | A * | 10/1998 | Huddleston | A01K 85/00 43/42.09 |
| 5,918,405 | A | 7/1999 | Marusak et al. | |
| 5,926,993 | A | 7/1999 | Marusak et al. | |
| 5,926,994 | A | 7/1999 | Mason et al. | |
| 5,946,847 | A | 9/1999 | North | |
| 6,061,948 | A | 5/2000 | Boucek | |
| 6,164,006 | A * | 12/2000 | Peterson | A01K 85/16 43/42.09 |
| 6,212,818 | B1 | 4/2001 | Huddleston | |
| 6,301,822 | B1 * | 10/2001 | Zernov | A01K 85/01 43/42 |
| 6,622,419 | B2 * | 9/2003 | Pearce | A01K 85/16 43/26.2 |
| 6,651,376 | B1 | 11/2003 | Link | |
| 6,675,526 | B1 | 1/2004 | Baron | |
| 6,718,683 | B2 * | 4/2004 | Hawkins | A01K 85/00 43/42.37 |
| 6,865,842 | B2 | 3/2005 | Brinkman | |
| 7,185,457 | B2 * | 3/2007 | Nichols | A01K 85/00 43/42.24 |
| 7,234,267 | B1 * | 6/2007 | Konstant | A01K 85/01 43/42.24 |
| 7,497,046 | B1 * | 3/2009 | Jefferson | A01K 85/00 43/42.24 |
| 7,614,178 | B2 | 11/2009 | Hoyt | |
| 7,637,050 | B2 * | 12/2009 | Brick | A01K 85/16 43/42.09 |
| 7,827,730 | B1 | 11/2010 | Jensen et al. | |
| 8,316,576 | B1 | 11/2012 | Brown | |
| 8,490,319 | B2 * | 7/2013 | Mancini | A01K 85/16 43/42.09 |
| 8,601,737 | B2 | 12/2013 | Beer et al. | |
| 8,910,415 | B2 | 12/2014 | Farr, Jr. | |
| 9,173,385 | B2 | 11/2015 | Cooper et al. | |
| 9,345,237 | B2 * | 5/2016 | Rapelje | A01K 85/16 |
| 9,713,321 | B2 * | 7/2017 | Smith | A01K 85/00 |
| 10,244,741 | B1 | 4/2019 | Hancock | |
| 10,575,506 | B2 | 3/2020 | Hancock | |
| 2002/0189150 | A1 * | 12/2002 | Thorne | A01K 85/18 43/42.15 |
| 2005/0223620 | A1 | 10/2005 | Pixton | |
| 2006/0042147 | A1 | 3/2006 | Jenkins | |
| 2006/0075678 | A1 | 4/2006 | Schammel et al. | |
| 2006/0117641 | A1 * | 6/2006 | Kumlin | A01K 85/16 43/42.22 |
| 2006/0260178 | A1 | 11/2006 | Jones et al. | |
| 2009/0113783 | A1 | 5/2009 | Hollomon | |
| 2009/0277071 | A1 | 11/2009 | Harris, Jr. | |
| 2010/0000145 | A1 | 1/2010 | Leppala | |
| 2010/0011653 | A1 * | 1/2010 | Barczak | A01K 85/16 43/42.03 |
| 2010/0229453 | A1 | 9/2010 | Cunningham | |
| 2010/0263259 | A1 | 10/2010 | Cuthbert | |
| 2013/0152450 | A1 | 6/2013 | Myerson et al. | |
| 2014/0325890 | A1 * | 11/2014 | Chennaz | A01K 85/01 43/42.06 |
| 2015/0082684 | A1 * | 3/2015 | Madala | A01K 85/18 43/42.35 |
| 2015/0282465 | A1 * | 10/2015 | Walsh | A01K 85/01 43/42.06 |
| 2016/0113257 | A1 | 4/2016 | Harrington | |
| 2016/0270380 | A1 * | 9/2016 | Shirakawa | A01K 85/16 |
| 2016/0360737 | A1 * | 12/2016 | Yates | A01K 85/18 |
| 2017/0000097 | A1 * | 1/2017 | Thomas | A01K 85/18 |
| 2017/0238514 | A1 * | 8/2017 | Hrncir | A01K 85/01 |
| 2018/0042206 | A1 | 2/2018 | St. John | |
| 2019/0008128 | A1 | 1/2019 | Walsh | |
| 2020/0100482 | A1 * | 4/2020 | Hajjar | A01K 85/18 |
| 2020/0344984 | A1 * | 11/2020 | Burns | A01K 93/00 |

OTHER PUBLICATIONS http://web.archive.org/web/20150923000105/http://www.fleetfarm.com/detail/southern-pro-tackle-rattle-eye-jig-orange/000000090151; website screenshot for the Southern Pro Tackle Rattle Eye Jig Orange Sep. 23, 2015.

https://allsharktankproducts.com/shark-tank-products-sports/the-world-record-striper-company-fishing-lures-and-tackle/; website screenshot for the Fishing Lures and Tackle; May 19, 2015.

https://www.rapala.com/rapala/lures/jigging-series/jigging-rap/Jigging+Rap.html; website screenshot for Rapala Jigging Rap; Nov. 30, 2020.

* cited by examiner

LURE WITH REMOVABLE TAIL

FIELD OF THE INVENTION

The present invention relates generally to the field of fishing. More particularly, the present invention relates to the field of lures.

BACKGROUND

Lures are used by fishing hobbyists and professionals to catch fish. Lures come in a wide variety of shapes, sizes and configurations and can often be relatively inexpensive. Further, lures are versatile in that they can be tailored to attract a particular type of fish by changing one or more characteristics, for example, the color, shape, or size. One type of lure is called a jig. Many jigs have one or more hooks attached to a body.

One aspect of an artificial bait that can make the bait appear lifelike is the sound and/or vibrations it makes. One attempt to create a lifelike eye in the fishing industry, as seen in U.S. Pat. Nos. 10,575,506 and 10,244,741, by the inventor and owned by the owner of the present application, which are hereby incorporated herein for all purposes, was to use one or more balls in an enclosed housing. As the lure moves in the water, the ball(s) move from one side of the housing to the other creating a life-like appearance and a clicking sound as the contact each other and the ends of the housing.

Embodiments of the lure with removable tail are disclosed with reference to the accompanying exemplary drawings, which are for illustrative purposes. It will be understood by those skilled in the art that one or more aspects of this invention can meet certain objectives, while one or more other aspects can lead to certain other objectives. Other objects, features, benefits and advantages of the present invention will be apparent in the summary and descriptions of the disclosed embodiment(s), and will be readily apparent to those skilled in the art. Such objects, features, benefits and advantages will be apparent from that previously described taken in conjunction with the accompanying figures and all reasonable inferences to be drawn therefrom.

DETAILED DESCRIPTION

As shown in FIGS. 1-4, a lure 10, for example a jig, includes a frame or body 12, one or more hooks and an eyelet or line tie 14 connected or attached to the body. In the embodiment seen in FIG. 1, the hooks include a treble hook 16 and a rear hook 18. The eyelet 14 can be used to attach the lure 10 to fishing line and, in one embodiment, is attached to a top side 20 of the body 12.

Figure 3:
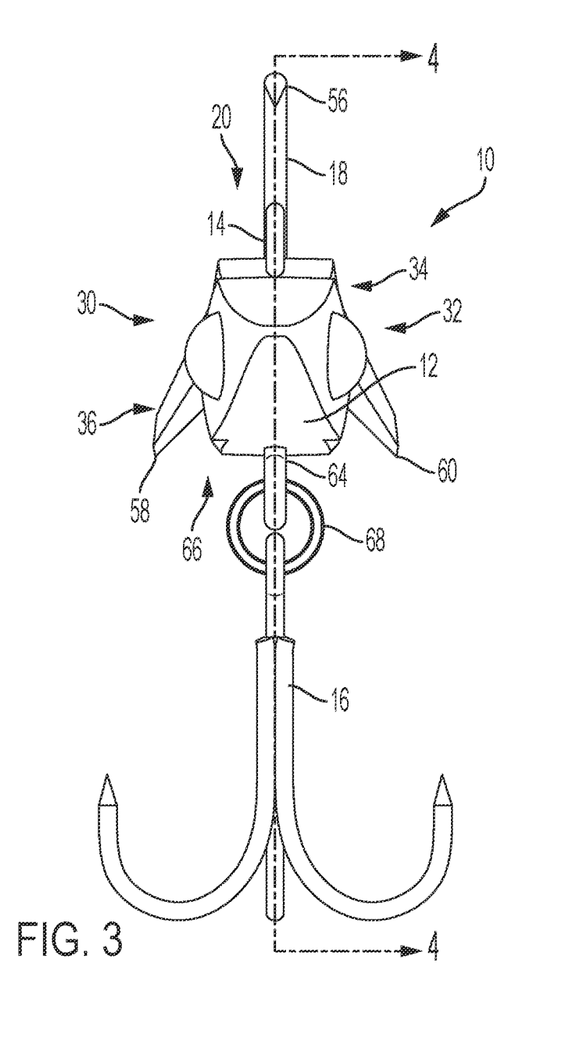
FIG. 3 is a front elevation view of the lure in FIG. 1.

The body 12 can include recesses and/or pockets to accommodate features or accessories. For example, as seen in FIG. 3, an opening 22 can be formed in the body 12. In the embodiment seen in FIG. 3, the opening 22 accommodates a noisemaking element 24 configured to make noise and/or vibrations when the lure 10 is retrieved. In one embodiment, the noisemaking element 24 is a brass bead 26 that that is located in or positioned inside the opening 22 and is slidably attached to or received on a rod 28 that extends through or positioned in the opening. The noisemaking element 24 could be of any desired shape, e.g. circular, rectangular, oblong, irregular, etc., and, more than one noisemaking element 24 could be used without defeating the spirit of the invention. Further, other materials known in the industry could be used to make the noisemaking element, for example, tungsten, lead, brass, zinc, stainless steel, or other materials that make the desired vibrations and/or sound, the use of which would not defeat the spirit of the invention.

One method of using a lure 10 is called rip-jigging. The lure 10 is pulled towards the fisherman or woman by pulling back on the rod and/or line as the lure is retrieved (also called "ripping"), which causes the lure to move towards the water surface in a quick manner. Then, the line is relaxed and the lure is allowed to sink back down and, in some cases, hit the floor of the lake, ocean, river or other body of water. And then the process is repeated.

When the lure 10 is ripped, the lure will move before the metal bead until the portion of the body 12 forming the first or back end of the opening 22 contacts the metal bead 26. When the lure 10 is allowed to sink the lure will slow down while the momentum of the bead 26 will cause it to contact the portion of the body 12 forming the second or front end of the opening 22. As the lure is pulled through the water, the forces of the water acting on the bead 26 could also move the bead and cause the bead to contact one or both of the portion of the body 12 forming a first end of the opening 22 and/or the portion of the body 12 forming a second end of the opening 22.

In one embodiment, the opening 22 extends from a first side 30 of the body 12 though to the second side 32 of the body. The opening 22 also permits a fish to see the moving noisemaking element 24, which makes the lure 10 appear more lifelike, such as, for example, by having a depth and three dimensional appearance. The different speed of movement between the lure 10 and the noisemaking element 24 can also help get a fish's attention and/or attract fish. However, the noisemaking element 24 could be inside the body 12 of the lure 10 or no noisemaking element may be included at all.

Figure 4:
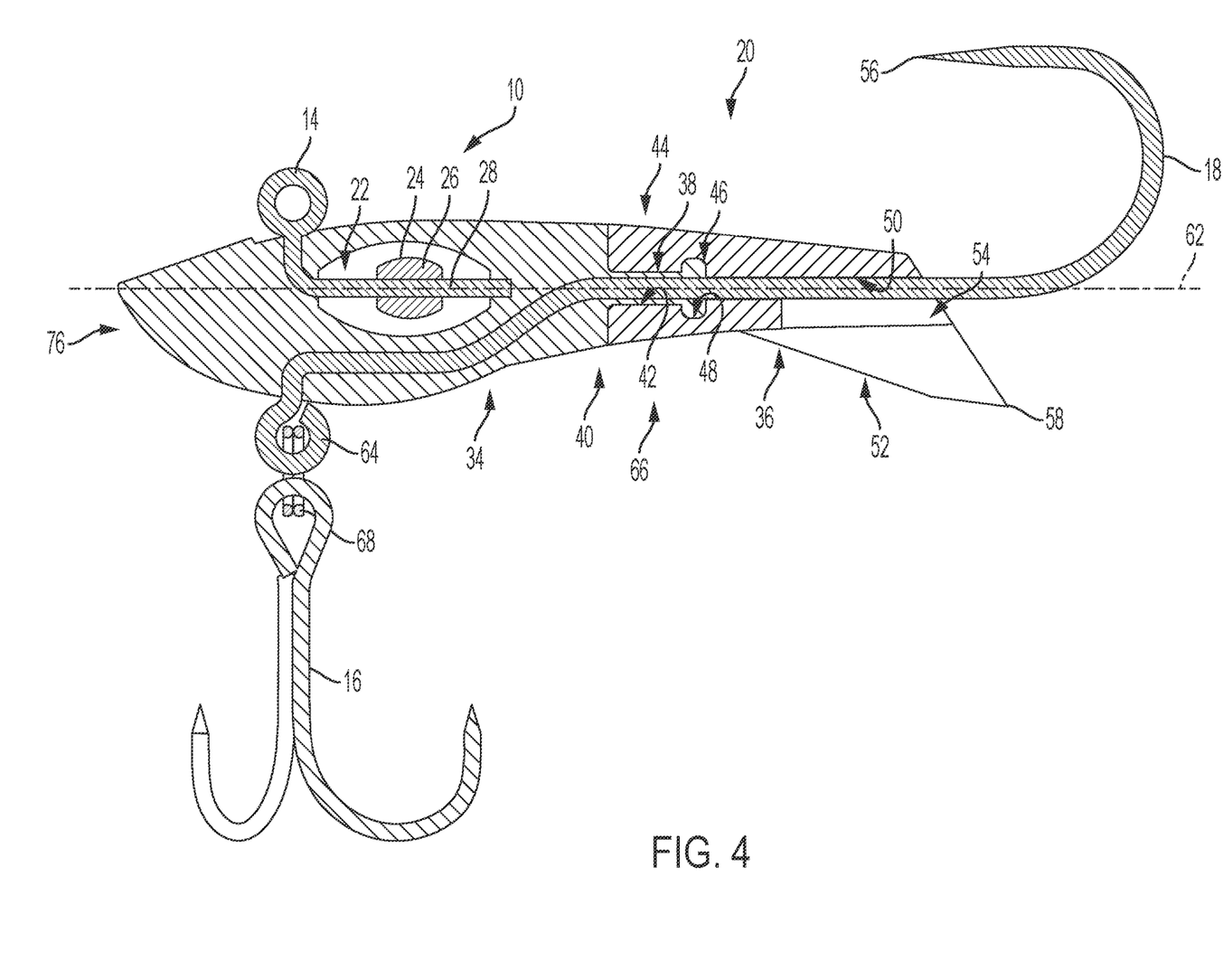
FIG. 4 is a side cross-sectional view of the lure of FIG. 3 taken from the line 4-4.

In one embodiment, best seen in FIG. 4, the body 12 is formed by combing two portions, a head or first body portion 34 and a tail or second body portion 36. In one embodiment, the head portion can be formed from lead, which provides the advantages of being cost-effective, injectable, permitting the lure to sink, and making a good sound and vibration when contacted by a noisemaking element 24 as described above. However, other materials known in the industry could be used, for example, tungsten, lead, brass, zinc, stainless steel, etc., the use of which would not defeat the spirit of the invention.

In some embodiments it is desired to coat the lure 10 with a paint, epoxy, enamel, or other coating. For example, if a lead material is used, it may be desirable to coat the lure 10 so that handling by a user would not result in lead poisoning. Coating the lure 10 can also increase the strength and longevity of the lure. Further, some fish can see and are attracted to colors more than others.

Figure 5:
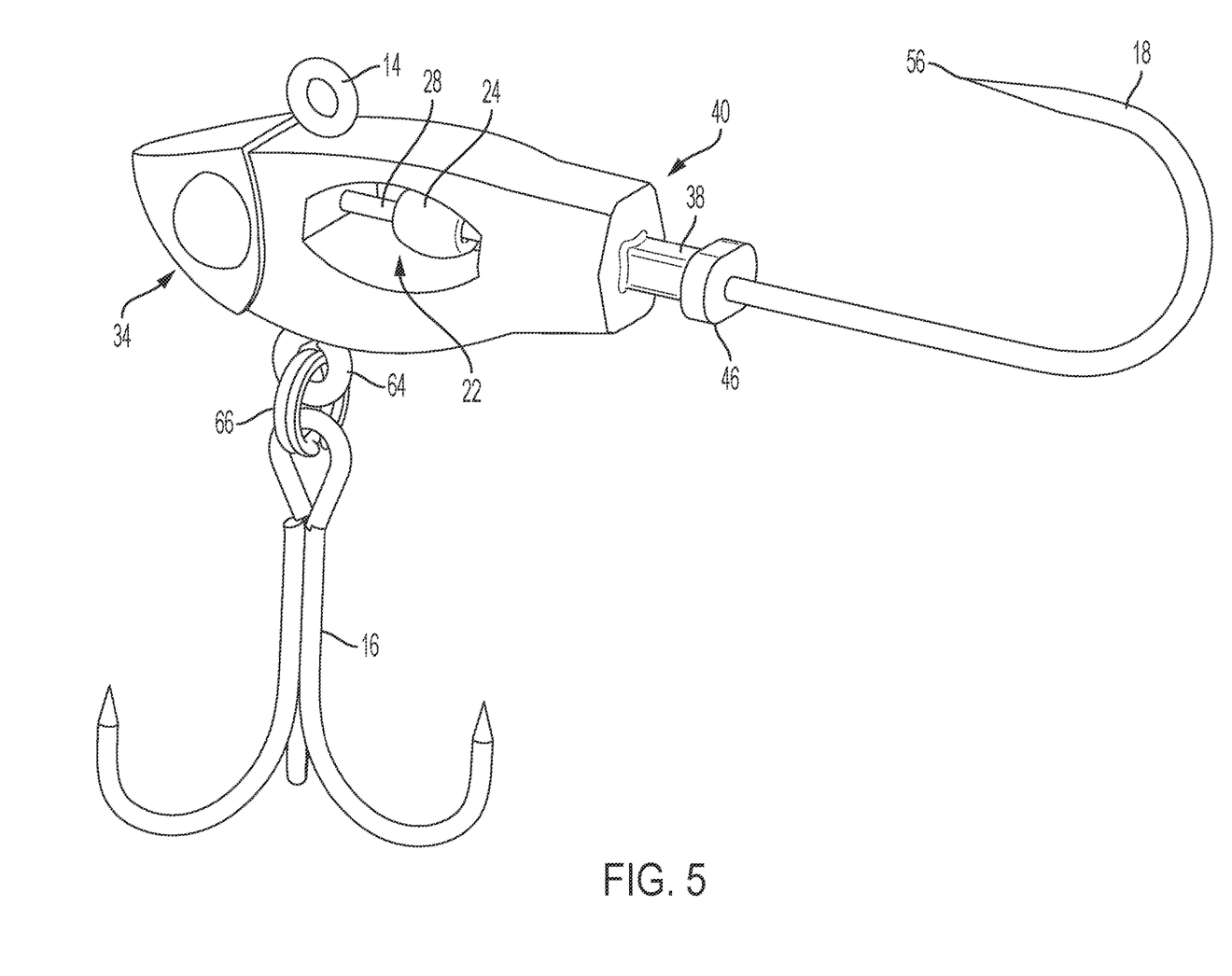
FIG. 5 is a side perspective view of one embodiment of a head portion of a lure.
Figure 7:
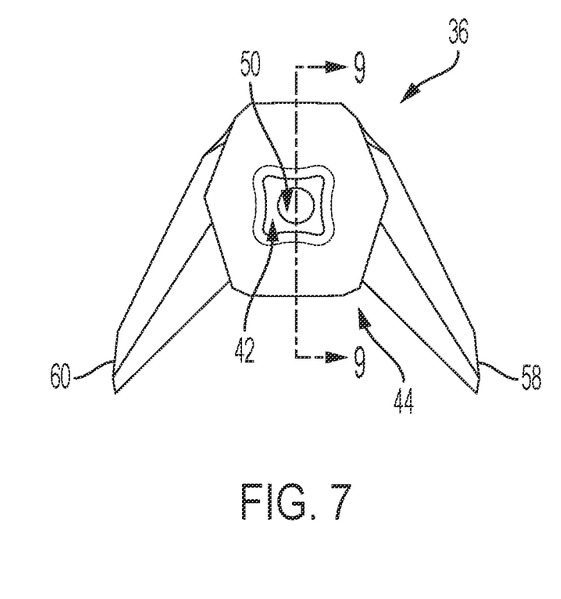
FIG. 7 is a front elevation view of the tail portion of FIG. 6.
Figure 8:
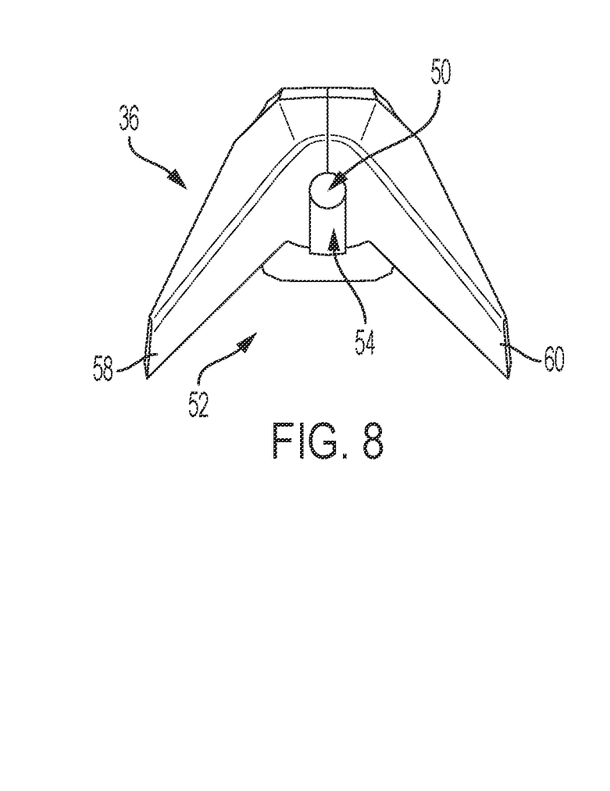
FIG. 8 a rear elevation view of the tail portion of FIG. 6.

In one embodiment seen in FIG. 5, the head portion 34 includes a post or peg 38 extending from one end, e.g. a first end 40, of the head portion. As seen in the embodiment illustrated in FIG. 7, the tail portion 36 has an aperture 42 formed in one end, e.g. a first end 44, for example a bore, configured, such as by being sized and shaped, to receive the post 38 of the head portion 34. However, other means for attaching are known in the industry, e.g. threading, spring pin, friction fitting, snap fitting, tongue, and groove, etc., the use of which would not defeat the spirit of the invention. Alternatively, the head portion 34 could have the aperture 42 and the tail portion 36 could have the post 38 without defeating the spirit of the invention.

As seen in FIGS. 4-5, the post 38 may also include an enlarged end or knob 46 that can be received in an enlarged cavity 48 (seen in FIG. 9) of the aperture 42 formed in the tail portion 36 to help the tail portion 36 stay attached to the head portion 34 when desired. The tail portion 36 may be made of a silicone material. However, other materials known in the industry could be used, for example, plastic, polyoxymethylene, acetal homopolymer, acrylonitrile butadiene styrene, latex, rubber, metal or any other material that permits the tail portion to function as desired, the use of which would not defeat the spirit of the invention. The resilient nature of silicone permits the aperture 42 to expand to receive the knob 46 and is resistant to breaking during a fish bite while still permitting some flexibility during retrieval. When the knob 46 reaches and is received in the enlarged cavity 48, the aperture can contract back around the post 38 to selectively or removably attach the tail portion 36 to the head portion 34.

In one embodiment, the tail portion 36 is formed by injection molding silicone into a mold. However, other means for forming objections are known in the industry, for example, spin casting, cutting, carving, etc., the use of which would not defeat the spirit of the invention.

Figure 9:
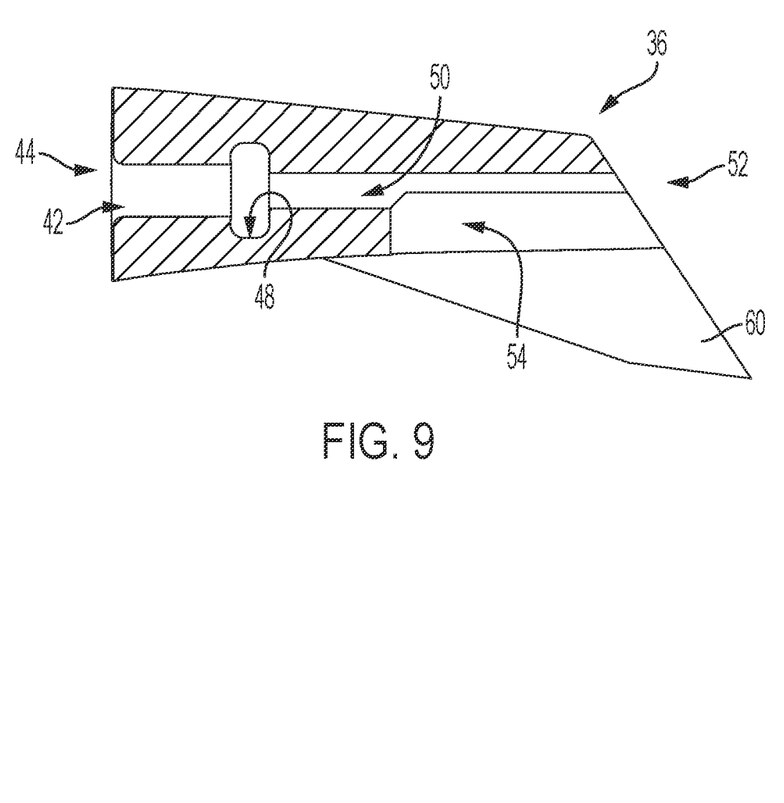
FIG. 9 is a side cross-sectional view of the tail portion of FIG. 7 taken from the line 9-9.

As seen in FIG. 5, the hook 18 extends from the head portion 34, and in one embodiment, extends from the post 38. To accommodate the hook 18, a passage 50 may extend from the end of the aperture 42 to the second side 52 of the tail portion as seen in FIG. 9. Alternatively, the aperture 42 may extend from the first end 44 of the tail portion through to the second end 52 of the tail portion. The passage 42 may also include a slot 54 to provide more room for the hook 18 as the tail portion 36 is selectively attached to or removed from the head portion 34. When the tail portion 36 is attached to the head portion 34, a portion of the hook extends through the aperture 42, and passage 50, and the second end of the hook 18 or pointed tip is exposed.

Figure 1:
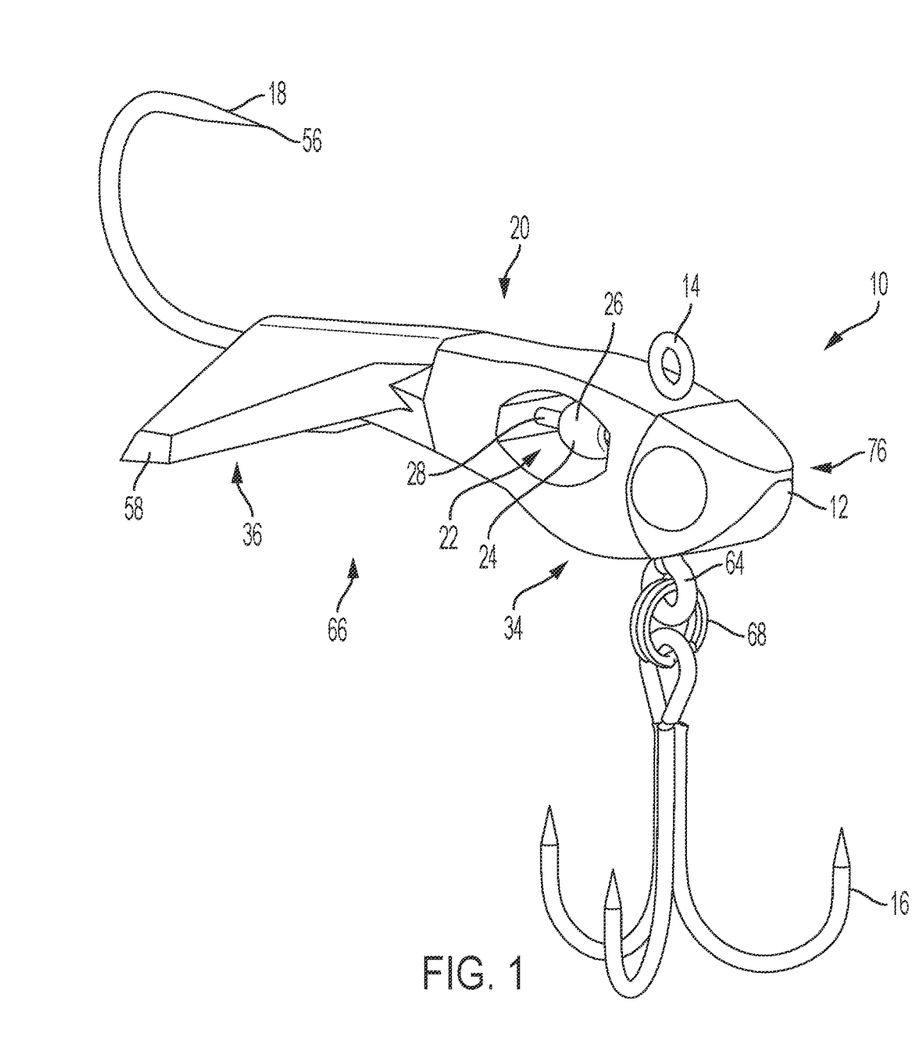
FIG. 1 is a side perspective view of one embodiment of a lure.
Figure 2:
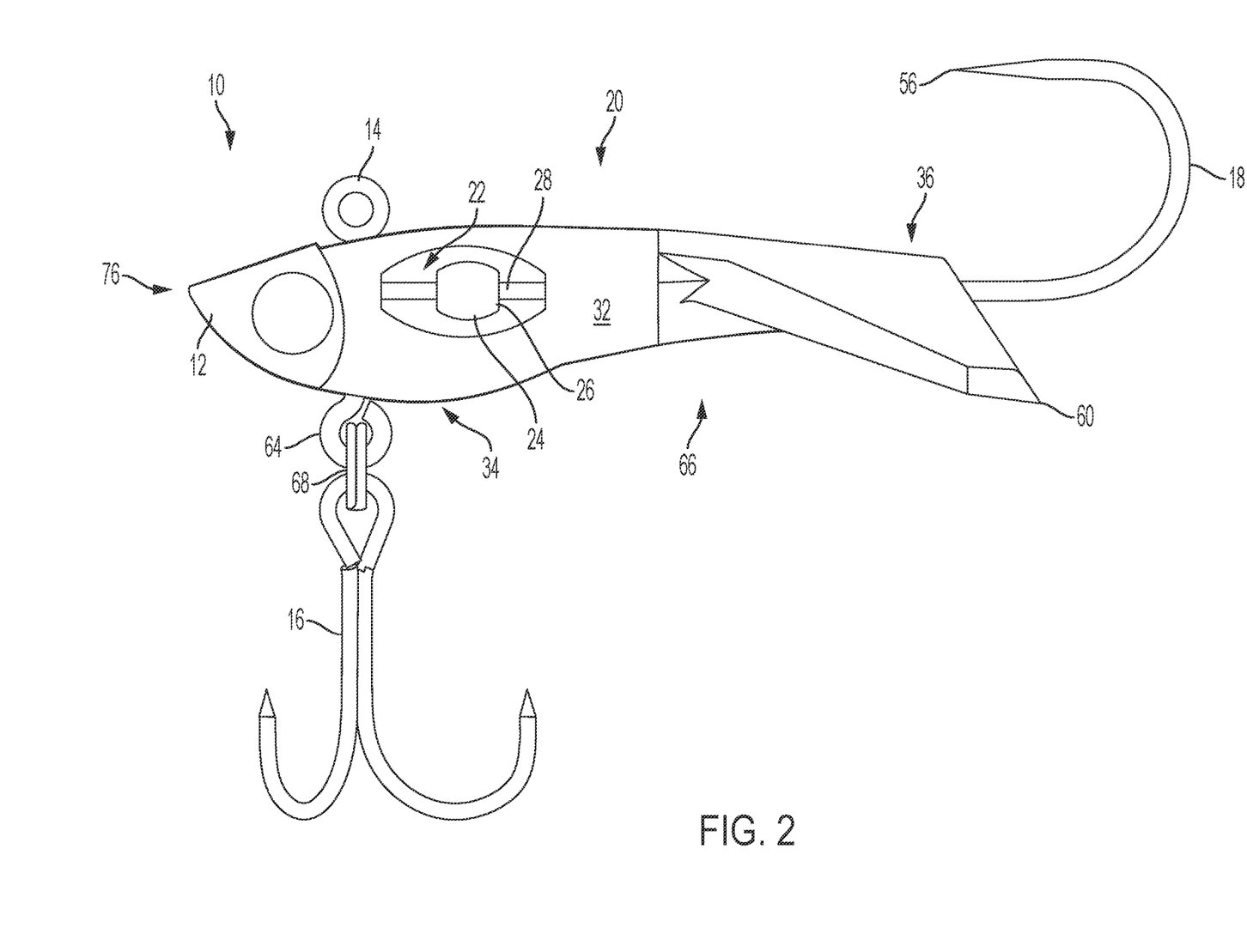
FIG. 2 is a side elevation view of the lure in FIG. 1.
Figure 6:
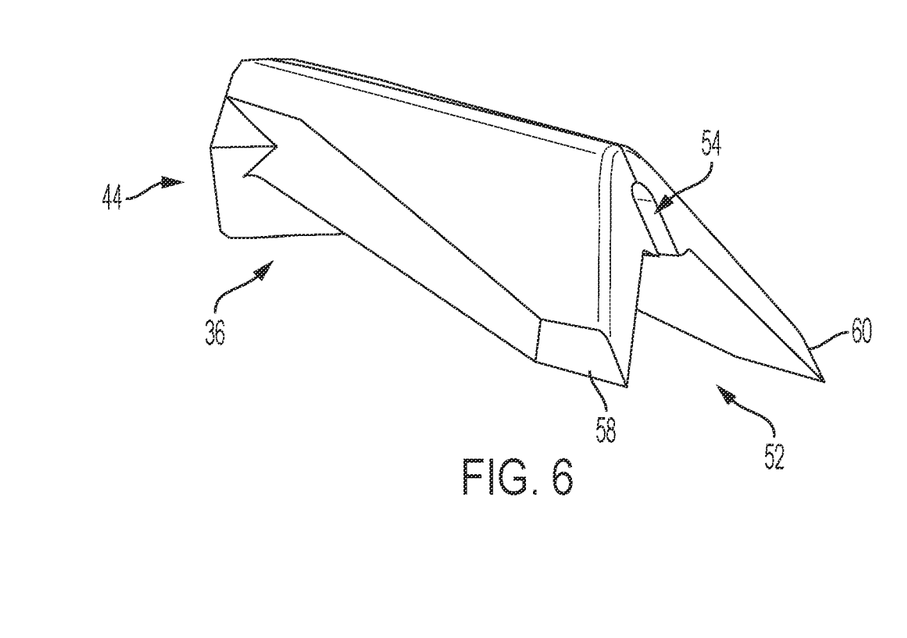
FIG. 6 is a side perspective view of one embodiment of a tail portion of a lure.

The ability to selectively attach the tail portion 36 to or remove it from the head portion 34 allows the tail portion or head portion to be replaced if it becomes damaged, for example, from a fish bite, or if a different shape, color or size is desired, e.g. to target different fish or for different fishing conditions (e.g. cloudy, murky water, etc.). For example, the tail portion could be shaped like the tail of a fish, as seen in FIG. 1, or like the legs of a frog. By way of another example, the head portion could be shaped like the head and part of the body of a fish, as seen in FIG. 1, or spherical, oblong, etc. The embodiment of the tail portion 36 seen in FIG. 6 has a first tail fin 58 and a second tail 60.

Figure 10:
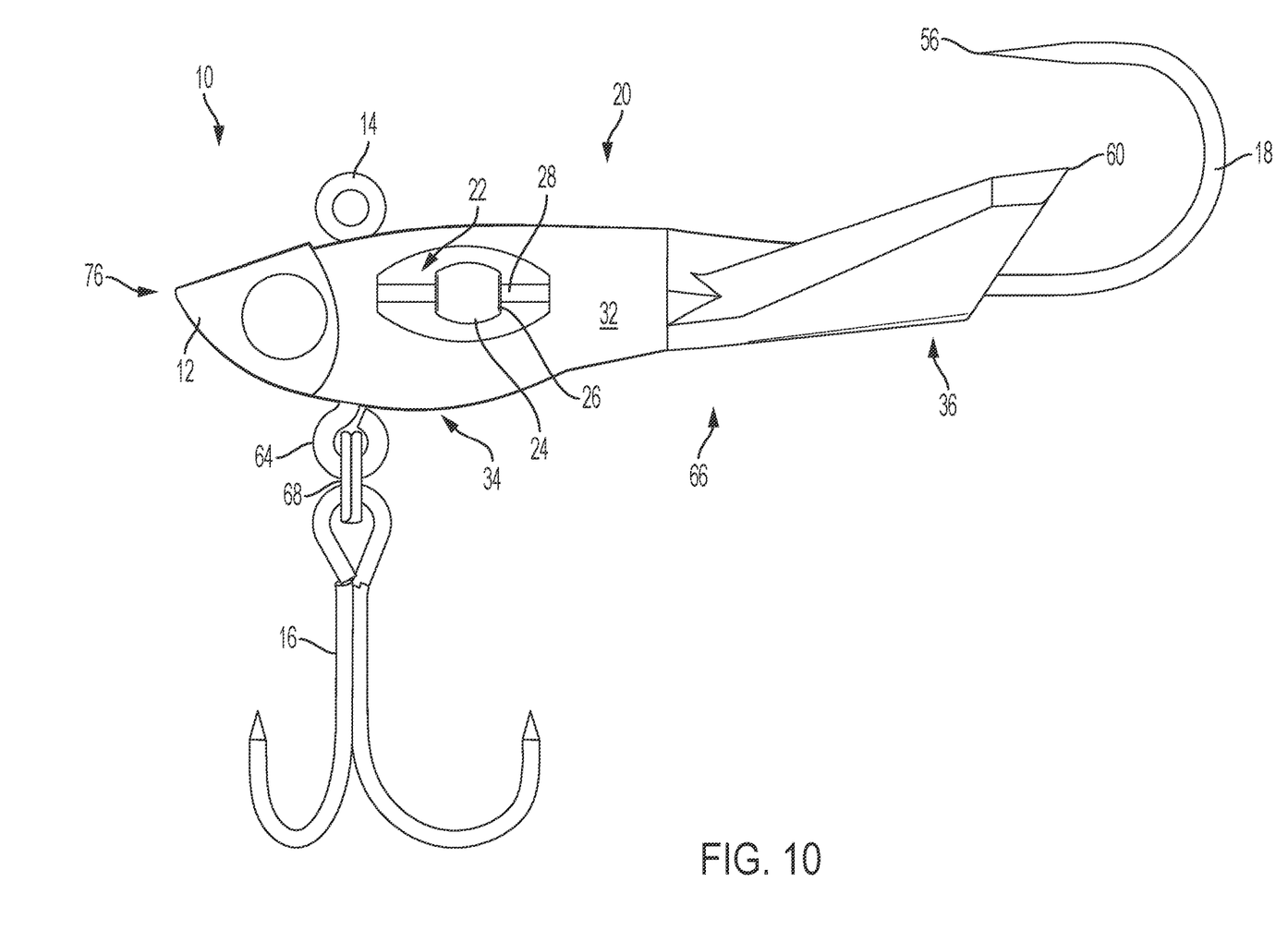
FIG. 10 is a side elevation view of the lure in FIG. 1 with the tail portion rotated.

In one embodiment, the tail portion 36 is rotatably attached to the head portion 34. The tail portion 36 may be rotated around the post 38 to achieve different action or performance from the lure 10. For example, when the tail is in a first position, as seen in FIG. 1, the first fin 58 and second fin 60 located on the second end 52 of the tail portion are angled downwardly causing the lure to glide down as the line is relaxed and the lure is moving towards the bottom of the lake, river, etc. When the tail is in the second position, as seen in FIG. 10, the fins 58, 60 are angled upwardly and will catch the water causing the lure 10 to move towards the surface at a steeper angle and/or wobble or move in different directions laterally as one or both of the fins 58, 60 catches the water. In one embodiment seen in FIG. 4, the tail portion 36 rotates about a longitudinal and horizontal axis 62 of the lure 10.

The post 38 can have a first cross sectional shape and the aperture 42 can have a second cross sectional shape. In some embodiments, first cross sectional shape and second cross sectional shape can be the same or similar, although they could also be dissimilar, e.g. a triangular or octagonal post 38 and a square aperture 42. In one embodiment, such as seen in FIG. 5, the post 38 is square in cross-sectional shape and the aperture is correspondingly square in cross-sectional shape. As the tail portion 36 is turned, the aperture 42 will expand until the square cross-sectional shape of the aperture is once again aligned with the cross-sectional shape of the post 38 to reach one of the plurality of pre-determined positions. As such, a fisherman or woman will be able to feel, e.g. a clicking or decrease in resistance, when the tail portion 36 is turned about ninety degrees as the corners of the post 38 are received into the corners of the aperture 42. If more rotational or pre-determined positions are desired, the shape of the post 38 and/or the aperture 42 can include shapes with more corners, e.g. pentagon, hexagon, octagon, etc. Further, the use of a round post 38 and/or the aperture 42 would permit the tail portion 36 to be rotated to any desired position. Alternatively, or additionally, the knob 46 could have the first cross sectional shape and the enlarged cavity 48 could have the second cross-sectional shape.

In one embodiment, the head portion is formed by injection lead into a mold. The line tie 14, rod 28 and hook 18 can be set into the mold and then the lead added to the mold to form the head portion 34. Other means for forming an object are known in the industry, for example, spin casting, fastening two halves of the head portion together, casting, cutting, carving, etc., the use of which would not defeat the spirit of the invention. Other means for attaching a line tie 14, rod 28, hook 18 and/or eyelet 64 are known in the industry, for example, fastening in holes (e.g. threading or gluing, ultra or sonic binding, friction, welding, snap-fitting), integrally forming, etc., the use of which would not defeat the spirit of the invention.

In one embodiment, seen in FIG. 9, the hook 18 has a pointed first end 56 and a second end 64 with an eyelet extending from the bottom side 66 of the head portion 34. A split ring 68 is attached to the eyelet 64 and a treble hook 16 attached to the split ring. Alternatively, an eyelet could be attached to the head portion 34 as described above either during the molding process or subsequently thereafter.

Figure 11:
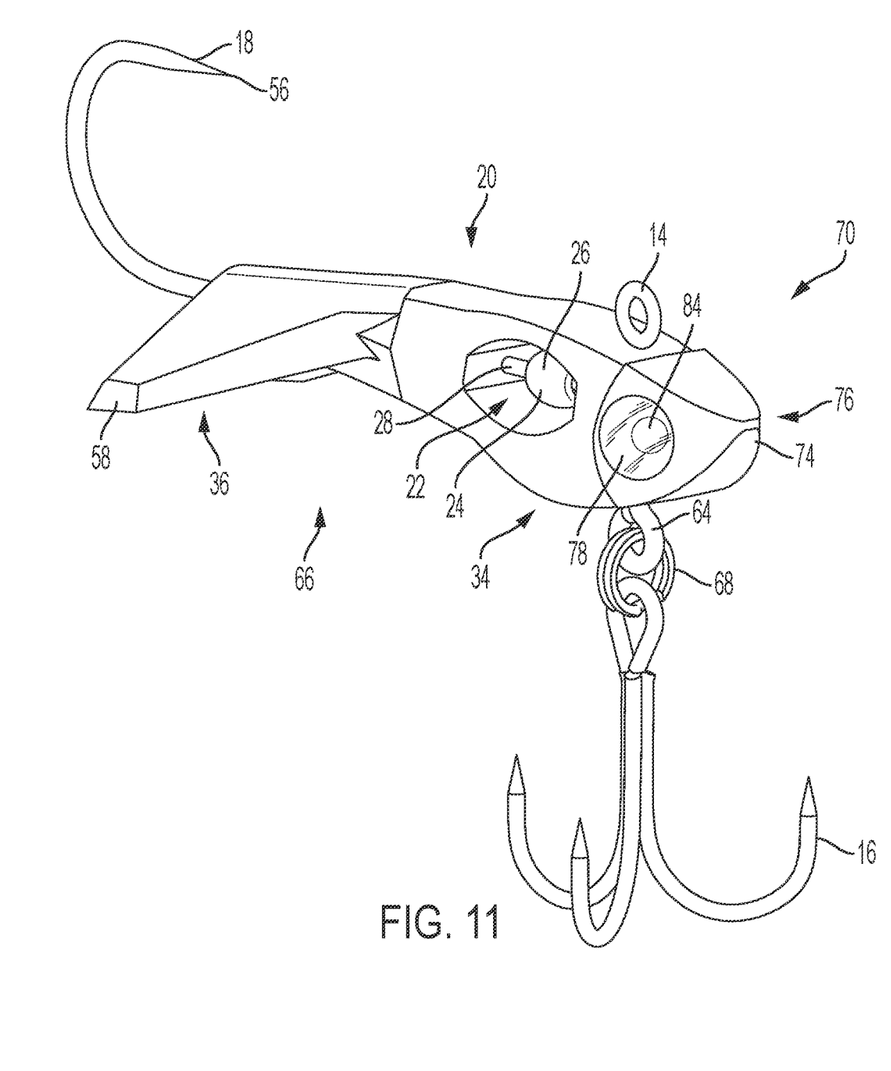
FIG. 11 is a side perspective view of an alternative embodiment of a lure.

In an alternative embodiment, seen in FIG. 11, the lure 70 includes a moving eye such as that taught in U.S. Pat. Nos.

Figure 12:
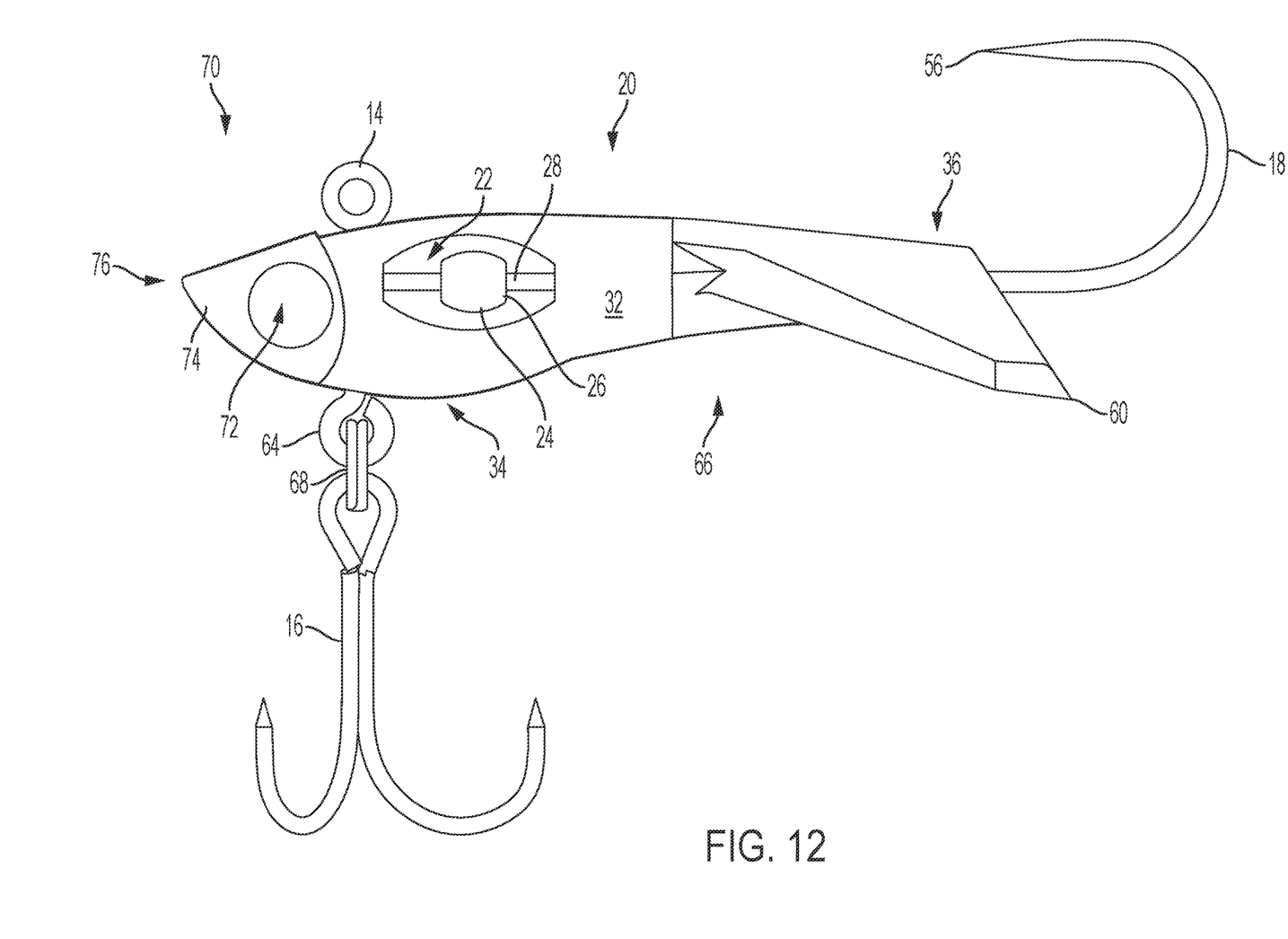
FIG. 12 is a side perspective view of the lure of FIG. 11 without the eye.
Figure 13:
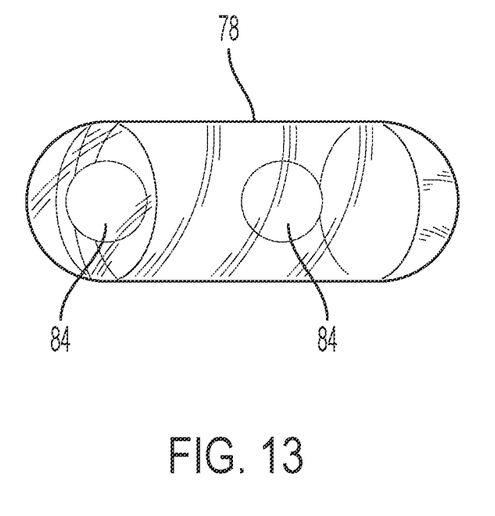
FIG. 13 is a side perspective view of the eye.

10,575,506 and 10,244,741. The lure 70 seen in FIG. 12 is similar to that see in FIG. 1, but has a hole or bore 72 formed in the body 74 in the general location of where an eye would be of the live bait which the lure 70 is attempting to mimic, e.g. near the front end 76 of the body 74. A tube 78 is located or positioned in the hole 72. The tube 78 extends and is visible from a first side 30 of the body 74 to, and is visible from, the second side 32 of the body. The tube 78 can include one or more noise making elements 84, e.g. balls or ball bearings, located in the tube that make a noise and vibration when they contact each other and/or the tube. The tube 78 may be made from a material that permits light through the material such that at least one ball 84 is visible through the tube when the at least one ball is located near one of the first end and second end of the tube. In one embodiment, the tube 78 is fixed in the hole 72 such as by epoxying; however, other means are known for attaching a tube in a hole including gluing, ultra or sonic binding, friction, welding, snap-fit, etc., the use of which would not defeat the spirit of the invention.

The exterior surface of the body or portions could include features to make the lure or jig look like the live bait it is attempting to mimic. For example, the front of the body could include a mouth, although other features could be used, for example, texturing of the body to resemble scales or reflect light, fins, eyes, legs, etc., painting, epoxying, etc., without defeating the spirit of the invention. In some cases, such features could be molded in the body or added thereto. By way of another example, the lure and/or the head portion could have an elongated body, sometimes referred to as a minnow jig, such as seen in FIG. 1, to more closely match the shape of a minnow or small fish.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein. Further, although certain advantages of different embodiments and disadvantages of certain prior art are described, no single claim must realize every or any benefit or overcome every or any disadvantage.

What is claimed is:

1. A lure comprising:
a body;
an eyelet attached to the body; and a
hook attached to the body;
wherein the body further comprises:
  a head portion having a post extending from one end of the head portion;
  a tail portion opposite the head portion, the tail portion having an aperture formed in a first end of the tail portion;
  wherein the first end of the tail portion is adjacent the head portion;
  wherein a second end of the tail portion is opposite the first end of the tail portion;
  wherein the second end of the tail portion forms an end of the lure furthest from the head portion;
  wherein the aperture is configured to receive the post to removably attach the tail portion to the head portion;
  wherein the second end of the tail portion is configured to be rotated between a first position and a second position when removably attached to the head portion; and
  wherein the lure is configured to perform differently in water when the tail portion is in the first position as compared to when the tail portion is in the second position;
  wherein, when the tail portion is in the first position, the second end of the tail portion is configured to cause the lure to move towards a water surface as the lure is retrieved.

2. The lure of claim 1, further comprising a treble hook attached to a bottom side of the body.

3. The e of claim 2, wherein the hook extends from the post and wherein the hook extends through the aperture when the tail portion is removably attached to the head portion.

4. The lure of claim 1, wherein the tail portion has a first fin and a second fin located on a second side.

5. The lure of claim 4, wherein when the tail portion is in the first position, the first fin and second fin are angled downwardly and wherein when the tail portion is in the second position, the first fin and second fin are angled upwardly.

6. The lure of claim 1, wherein the head portion has an opening formed therein and wherein a noisemaking element is located in the opening.

7. The lure of claim 6, wherein the noisemaking element is a bead slidably received on a rod.

8. The lure of claim 1, further comprising a tube positioned in a hole formed in the body;
and
  at least one ball located in the tube;
    wherein the at least one ball creates a noise and vibration when the at least one ball contacts the tube.

9. A lure comprising:
a first body portion;
a line tie attached to the first body portion;
a hook extending from the first body portion; and
a second body portion rotatably attached to the first body portion;
a non-circular peg extending from the first body portion;
wherein the first body portion does not include a bill configured to steer the lure;
wherein the second body portion may be selectively attached and removed from the first body portion;
wherein the second body portion is configured to be removably attached to the first body portion in a number of fixed pre-determined positions;
wherein a bore is formed in the second body portion; and
wherein the first body portion is rotatably attached to the second body portion when the peg is received in the bore.

10. The lure of claim 9, further comprising a knob located on the peg;
wherein an enlarged cavity is formed in the second body portion; and
wherein the first body portion is rotatably attached to the second body portion when the knob is received in the enlarged cavity.

11. The lure of claim 9, wherein the peg has a first cross-sectional shape; wherein the bore has a second cross-sectional shape; and
  wherein the first cross-sectional shape and the second cross-sectional shape are a similar shape.

12. The lure of claim 11, wherein the second body portion is in one of the plurality of fixed pre-determined positions when the first cross-sectional shape is aligned with the second cross-sectional shape.

13. The lure of claim 11, wherein the first cross-sectional shape and second cross-sectional shape is a square.

14. The lure of claim 9, further comprising a second hook connected to a bottom side of the first body portion.

15. The lure of claim 9, wherein the bore extends from a first end of the second body portion to a second end of the second body portion;
   wherein a portion of the hook extends through the bore; and
   wherein a tip of the hook is exposed.

16. A lure comprising:
   a frame;
   a line tie attached to a top side of the frame;
   a hook attached to the frame;
   an opening formed in the frame;
   a rod extending through the opening;
   a noisemaking element slidably attached to the rod, the noisemaking element configured to make noise and vibration when the lure is retrieved; and
   a tail portion configured to be selectively attached to the frame in at least one position;
   wherein the tail portion has a first end and a second end;
   wherein the frame forms a first end of the lure;
   wherein the second end of the tail portion forms a second end of the lure furthest from the first end of the lure; and
   wherein the second end of the tail portion is configured to cause the lure to move laterally in at least two directions when the tail portion is in the at least one position.

17. The lure of claim 16, wherein the rod extends through the noisemaking element.

18. The lure of claim 17, wherein the noisemaking element is a bead and wherein the bead makes noise and vibration when the bead contacts a portion of the frame forming the opening.

19. The lure of claim 18, wherein the opening extends from a first side of the frame through to a second side of the frame such that the bead is visible.

20. The lure of claim 1, wherein the second end of the tail portion is configured to cause the lure to perform differently in water when the tail portion is in the first position as compared to when the tail portion is in the second position.

* * * * *

UNITED STATES PATENT AND TRADEMARK OFFICE
CERTIFICATE OF CORRECTION

PATENT NO. : 11,363,805 B1
APPLICATION NO. : 17/108032
DATED : June 21, 2022
INVENTOR(S) : Hancock Page 1 of 1

It is certified that error appears in the above-identified patent and that said Letters Patent is hereby corrected as shown below:

In the Claims

Column 6, Line 16, in Claim 3:
--lure-- should replace "e"

Signed and Sealed this
Eleventh Day of October, 2022

Katherine Kelly Vidal
*Director of the United States Patent and Trademark Office*